Figure 1:
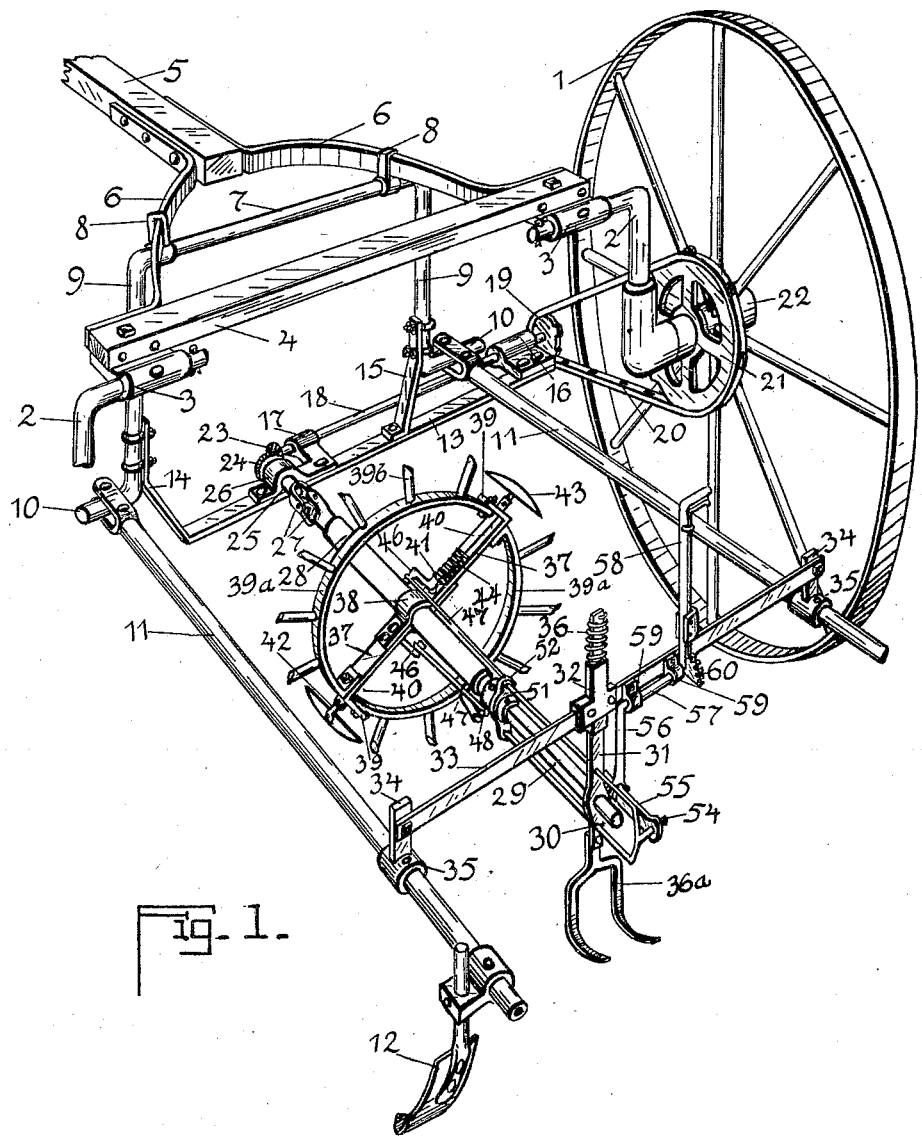

A. E. ASHLIMANN.
COTTON CHOPPER.
APPLICATION FILED JUNE 1, 1911.

1,005,792.

Patented Oct. 17, 1911.

2 SHEETS—SHEET 1.

WITNESSES:
R. Bruckner
E. E. Ballard.

INVENTOR
Adolf E. Ashlimann.
BY
John M. Spellman.
ATTORNEYS

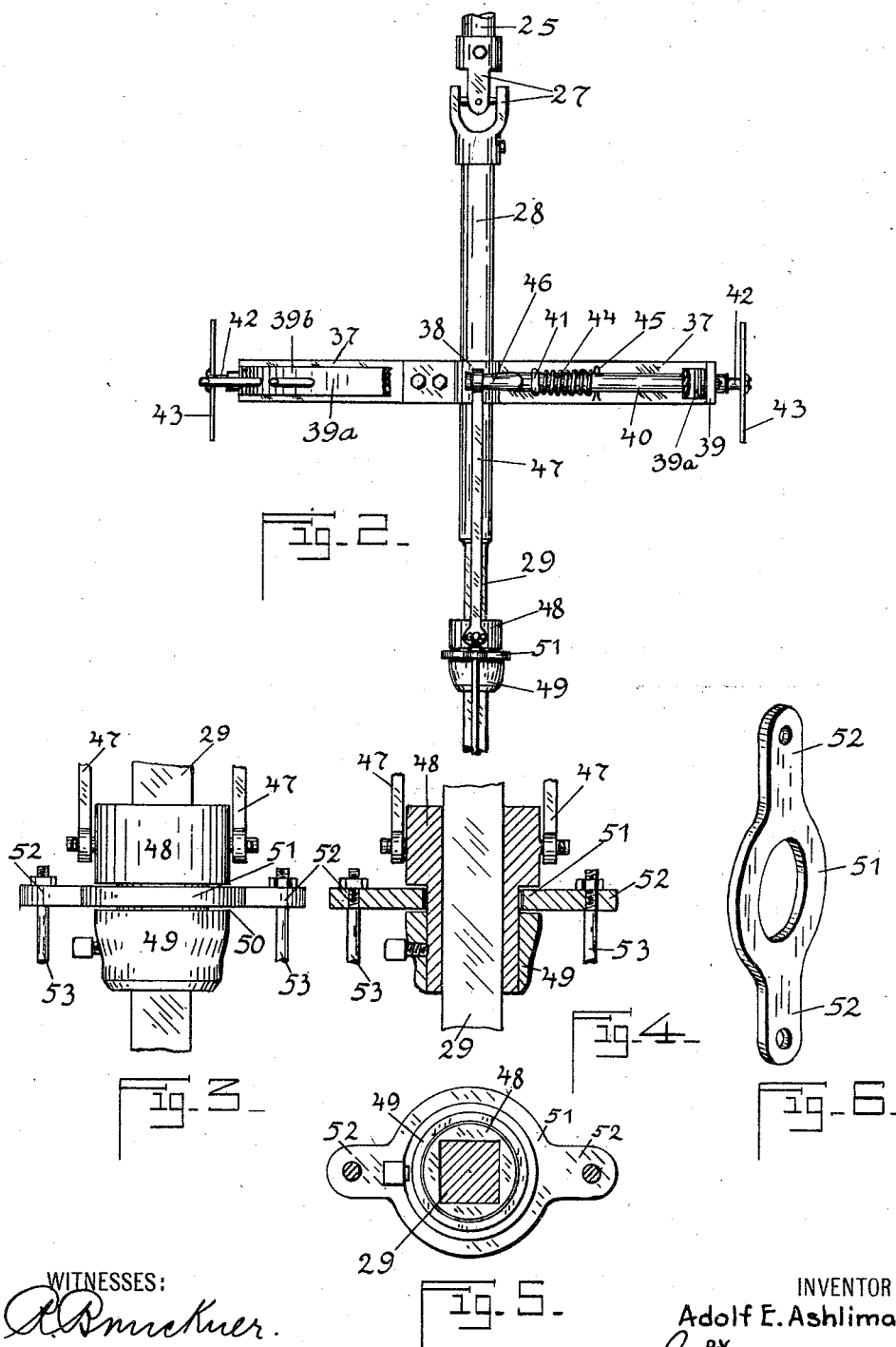

UNITED STATES PATENT OFFICE.

ADOLF E. ASHLIMANN, OF HASKELL, TEXAS, ASSIGNOR OF ONE-FOURTH TO HENRY ALEXANDER, OF HASKELL, TEXAS.

COTTON-CHOPPER.

1,005,792.  Specification of Letters Patent.  Patented Oct. 17, 1911.

Application filed June 1, 1911.  Serial No. 630,579.

*To all whom it may concern:*

Be it known that I, ADOLF E. ASHLIMANN, a citizen of the United States, residing at Haskell, in the county of Haskell and State of Texas, have invented certain new and useful Improvements in Cotton-Choppers, of which the following is a specification.

My invention relates to new and useful improvements in cotton choppers. Its object is to provide a cotton chopping mechanism particularly adapted to be employed as an attachment for an ordinary cultivator, which will travel along a row of cotton plants automatically cutting the row into equidistant hills, and at the same time turning up the ground between the rows.

The object is more specifically to provide a cotton chopper consisting of a horizontal shaft longitudinally supported in a cultivator frame, carrying a pair of oppositely projecting hoes, and adapted to receive rotation from one of the transporting wheels of the machine.

Another object is to provide a device, having the nature of a spiked ring which will rotate with the hoes and will break the crust of the ground and clear out rocks and trash so that the hoes may chop without hindrance.

A further object is to provide a mechanism for controlling the angle formed by the hoe-blades with the earth, so that the width of their cut may be thus regulated, making it possible to vary the spaces between the hills of cotton plants.

Finally the object of the invention is to provide a device of the character described that will be strong, durable, simple and efficient and comparatively easy to construct, and also one that will not be likely to get out of working order.

With these and various other objects in view, my invention has relation to certain novel features of the construction and operation, an example of which is described in the following specification and illustrated in the accompanying drawing, wherein:

Figure 1 is a perspective view of an ordinary cultivator, to which the herein described cotton chopper is attached, various parts of the cultivator construction, not necessary to an understanding of the present invention, being broken away. Fig. 2 is a plan view of the shaft which carries the chopping hoes, showing a portion of the mechanism employed to communicate a partial rotation to the shanks of said hoes, the spiked ring being in part broken away to show parts hidden thereby. Fig. 3 is a detail view, showing a sliding collar mounted upon a rectangular portion of the shaft which carries the hoes, said collar being provided with an annular groove receiving a collar, through which a displacement may be communicated to the sliding collar. Fig. 4 is a sectional view of the same. Fig. 5 is an end view of the same, or a view looking in the direction of the shaft. Fig. 6 is a perspective view of the collar which fits in the annular groove of the collar illustrated in the figures already described.

Referring now more particularly to the drawing, wherein like numerals of reference indicate similar parts in all of the figures, the numeral 1 denotes the transporting wheels of a cultivator, which are rotatably mounted upon the lower horizontal members of Z-shaped axles 2, the upper horizontal members of said axles being pivotally mounted in bearings 3 secured to each extremity of a beam 4, upon the under side of said beam. The tongue of the cultivator, which is designated by the numeral 5, is on a horizontal level with the beam 4, its rear end terminating some distance in front of said beam, and being rigidly attached to the beam extremities by a pair of curved bars 6. Beneath these bars is suspended an arch, consisting of a horizontal member 7, parallel to the beam 4 and attached to the bar 6 by brackets 8, and vertical members 9 extending downwardly from each extremity of the member 7, and having their lower ends turned outwardly as indicated at 10. Each of the two horizontal portions 10 of the arch furnish a pivotal support for the forward extremity of a cultivator beam 11, the said extremity being bifurcated to receive the parts 10. The plows carried by the cultivator beam are indicated by the numeral 12.

A transverse bar 13 is mounted beneath the aforesaid arch, one of the extremities of the bar being turned up, as indicated at 14, and clamped to the lower portion of the left-hand vertical arch member 9. The other extremity of the bar 13 is supported by a bracket 15, clamped to the lower portion of the right-hand vertical arch member 9, and having its lower end bolted or riveted to the bar. The right-hand extremity of the bar 13 projects laterally some distance beyond the bracket 15, and carries a bearing 16 upon its extremity. A similar bearing 17 is carried by the middle portion of the bar, and in these two bearings is rotatably mounted a shaft 18 positioned slightly in front of the bar 13 and above the same. A sprocket wheel 19 is fast upon the extremity of the shaft 18 adjacent to the bearing 16. Rotation may be communicated to the shaft from the right-hand transporting wheel by a chain 20, carried by the sprocket wheel 19 and by a sprocket wheel 21 fast upon the hub 22 of said wheel.

Upon the other extremity of the shaft 18, adjacent to the bearing 17, is mounted a beveled pinion 23. This pinion meshes with a similar pinion 24 carried by the forward extremity of a short shaft 25, positioned at right angles with the shaft 18 in a bearing 26 carried by the bar 13. The rear end of the shaft 25 is connected by a universal coupling 27 with the forward end of a shaft 28 extending longitudinally of the machine. The rear portion of this shaft is of square cross-section, as indicated at 29, and terminates in a short journal portion 30, which is mounted in the lower extremity of a vertical bar 31. This bar passes through a socket 32, rigidly mounted at the middle portion of a transverse bar 33. The extremities of the bar 33 are secured to upright arms 34, projecting integrally from the collars 35 fast upon the cultivator beams. The bar 31 is free to undergo sliding displacement in the socket 32, and its weight, with that of the rear end of the shaft 28, is supported by a spring 36 coiled about the upper extremity of the bar and resting upon the socket 32, the upper end of said spring being fixed at the top of the bar. A forked supporting means 36ª is also provided upon the lower extremity of the bar 31, the two vertical members of said means being curved rearwardly at their lower extremities so as to furnish a supporting surface. The device 36ª prevents the hoes from cutting too deep.

Near the middle of the shaft 28 are clamped a pair of contiguous bars 37, perpendicular to said shaft and projecting in opposite direction therefrom. Each of these bars is provided with a semi-cylindrical portion 38 near its inner end, said portions receiving opposite sides of the shaft. The outer extremities of the two bars 37 are turned at a right angle and in opposite directions, as is indicated at 39. A semi-circular bar 39ª is mounted upon the bars 37 at each side of the shaft 28, the two bars 39ª together forming a ring concentric with the shaft 28 and carrying a plurality of radial spikes 39ᵇ. These spikes project slightly farther than the hoe blades, which will presently be described, so as to break the ground and remove any obstacles which might interfere with the operation of the hoes.

Each of the upturned portions 39 of the bars 37 forms a bearing for the outer extremity of a crank-shaft 40, the inner end of said shafts being received by eye bolts 41, one of which is rigidly fixed in each bar. The outer ends of the two crank-shafts form sockets, receiving the shanks 42 of the hoe blades 43. These blades will preferably be elongated in the direction of the cutting edge, which edge will be slightly curved, as is shown in the drawing. Upon each of the two crank-shafts 40 is coiled a spring 44, one end of which abuts against the eye bolt 41 and the other against a cotter pin 45, passing through the crank-shaft. When either of the hoes is making a stroke, and comes into contact with some unyielding obstacle, such as a stone, the hoe, with the crank-shaft which carries it, will be upwardly displaced, the spring 44 being at the same time compressed. This arrangement prevents the hoe blades from becoming frequently broken or bent. Upon the inner extremity of each crank-shaft 40, there is provided a crank arm 46, said crank arms occupying a vertical position when the hoe blades are horizontal. From each crank arm, a rod 47 extends rearwardly adjacent to the shaft, the other extremity of said rod being attached to opposite sides of a collar 48, slidably mounted upon the rectangular portion 29 of the shaft 28. The collar 48 has about half of its length reduced in diameter, said reduced portion receiving a set collar 49, which, in conjunction with the collar 48, forms an annular groove, designated by the numeral 50. This groove receives a loose fitting collar 51, provided with a pair of integral lugs 52 at opposite sides, in vertical alinement. In these lugs are fixed the forward extremities of a pair of rods 53 which extend rearwardly parallel to the shaft 28, and which pass through apertures provided in the bar 31 at an equal distance above and below the shaft 30. The rear extremities of the rods 53 are turned up and down respectively, so as to meet at a point midway between said rods, said extremities then being turned contiguously outward at right angles to the plane in which the rods are situated, as indicated at 54. A swinging link 55 has one of its extremities pivotally mounted upon the parts 54, and its other extremity is pivotally engaged by the lower end of a lever member 56, which, in conjunction with a horizontal member 57, and an upwardly projecting vertical member 58, forms a manipulating lever by which the collar 48 may be subjected to a sliding displacement, thus producing a partial rotation of the two crank-shafts 40. The horizontal portion 57 of the lever acts as a pivot, said portion being mounted in a pair of bearings 59 attached to the cross-bar 33. The lever is adapted to be held in its various positions of adjustment by the usual expedient of a toothed quadrant 60, acting in conjunction with a spring-pressed toothed rod.

From the above description, the manner in which the machine operates is evident. A rotation is communicated to the shaft 18 from the right-hand transporting wheel through the chain and sprocket mechanism formed by parts 19, 20, and 21, and this rotation is transmitted from the shaft 18 to the shaft 28 through the bevel gears 23 and 24, and through the universal coupling 27. By employing a universal coupling to communicate rotation to the shaft 28, and by the use of the spring 36 to support the weight of the rear extremity of said shaft, the shaft is given a flexibility of motion, which will cause it to yield when the hoes encounter a rock or other fixed obstacle, thus avoiding possible breakage of the mechanism. The lever mechanism, by which the angle of the hoe blades is regulated, forms a convenient means by which the size of the hills and the space between the same may be readily regulated.

It is apparent that various changes may be made in the details and proportion of parts of the above described device, and the invention is, therefore, presented as including all such changes and modifications as may be included within the scope of the following claims.

What I claim is:

1. In a cotton chopper, the combination with a wheeled frame, of a shaft longitudinally mounted in said frame, a mechanism communicating rotation to said shaft from one of the transporting wheels, bars rigidly projecting from said shaft in opposite directions, a crank-shaft rotatably mounted on each of said bars, a hoe blade carried at the outer extremity of each crank-shaft, a mechanism by which the crank-shafts may be made to simultaneously undergo angular adjustment, and means by which the crank-shaft may be held in any position of angular adjustment.

2. In a cotton chopper, the combination with a wheeled frame, of a shaft rotatably mounted longitudinally of the frame, a mechanism adapted to communicate rotation to said shaft from one of the transporting wheels, a pair of bars rigidly projecting from said shaft in opposite directions, a crank-shaft perpendicular to said shaft mounted upon each bar, a hoe blade carried at the outer extremity of each crank-shaft, a spring coiled upon each crank-shaft normally restraining the same against inward displacement toward the longitudinal shaft, and adapted to permit such displacement under heavy pressure, and means for simultaneously subjecting the crank-shafts to angular displacement, and for holding them in various positions of such displacement.

3. In a cotton chopper, the combination with a wheeled frame, of a shaft rotatably mounted in said frame longitudinally thereof, a mechanism adapted to communicate rotation to said shaft from one of the transporting wheels, a pair of bars projecting rigidly from said shaft at opposite sides thereof, a crank-shaft mounted upon each bar perpendicular to said longitudinal shaft, a hoe blade carried at the outer extremity of each crank-shaft, means furnishing a resilient support for the rear end of the longitudinal shaft, and a mechanism by which the crank-shafts may be simultaneously subjected to angular displacement, and held in various positions of such displacement.

4. In a cotton chopper the combination with a wheeled frame, of a shaft rotatably mounted in said frame longitudinally thereof, a mechanism adapted to communicate rotation to said shaft from one of the transporting wheels, a pair of bars rigidly projecting from said shaft at opposite sides thereof, a crank-shaft rotatably mounted upon each bar perpendicular with the longitudinal shaft, a hoe blade carried at the outer extremity of each shaft, a crank arm provided on the inner extremity of each crank-shaft, a sliding collar mounted on the rear portion of the longitudinal shaft, and adapted to rotate therewith, said collar being provided with an annular groove, a pair of rods, each having one extremity secured to one of the crank arms, the other extremity of said rods being attached to the sliding collar at opposite sides thereof, a collar fitting loose in said annular groove, a lever pivotally mounted upon the frame of the machine at the rear thereof, and a mechanism connecting the last named collar to said lever, such that an angular displacement of the lever produces a sliding displacement of the collar.

5. In a cotton chopper, the combination with a wheeled frame, of a shaft longitudinally mounted in said frame, a mechanism communicating rotation to said shaft from one of the transporting wheels, bars rigidly projecting from said shaft in opposite directions, a crank-shaft rotatably mounted in each of said bars, a hoe blade carried at the outer extremity of each crank-shaft, a mechanism by which the crank-shafts may be made to simultaneously undergo angular adjustment, means by which the crank-shafts may be held in any position of angular adjustment, a semi-circular bar rigidly mounted on said bars at each side of the shaft, forming a ring, and a plurality of spikes projecting radially outward from said semi-circular bars.

6. In a cotton chopper, the combination with a wheeled frame, of a shaft rotatably mounted in said frame longitudinally thereof, means by which the rear end of said shaft may be supported from the ground, a pair of bars projecting rigidly from said shaft in opposite directions, a crank-shaft perpendicular to said shaft mounted upon each bar, a hoe blade carried at the outer extremity of each crank-shaft, a spring coiled upon each crank-shaft normally restraining the same against inward displacement toward the longitudinal shaft and adapted to permit such displacement under heavy pressure, means for simultaneously subjecting the crank-shafts to angular displacement, and for holding them in various positions of such displacement, a ring concentric with the main shaft supported by said bars, and a plurality of spikes projecting radially outward from said ring.

In testimony whereof I have signed my name to this specification in the presence of two subscribing witnesses.

ADOLF E. ASHLIMANN.

Witnesses:
JOHN H. CAROTHERS,
K. JONES.

Copies of this patent may be obtained for five cents each, by addressing the "Commissioner of Patents, Washington, D. C."